Feb. 2, 1937.   D. I. SOLOMON   2,069,284
ELECTROTHERMAL THERAPEUTIC APPARATUS
Filed Feb. 6, 1935
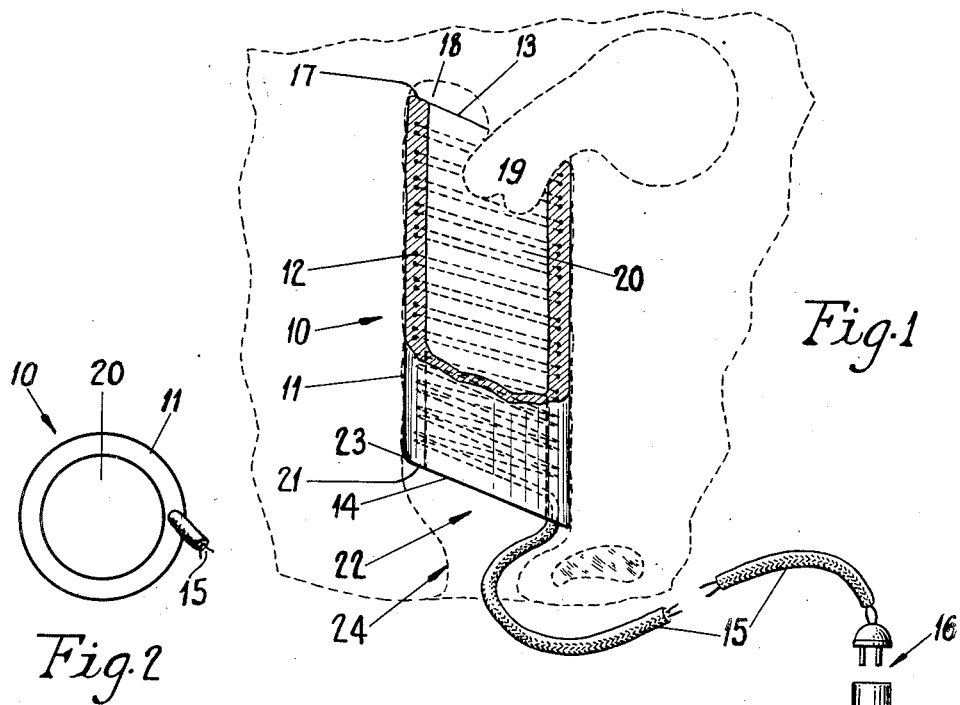
Fig.1
Fig.2
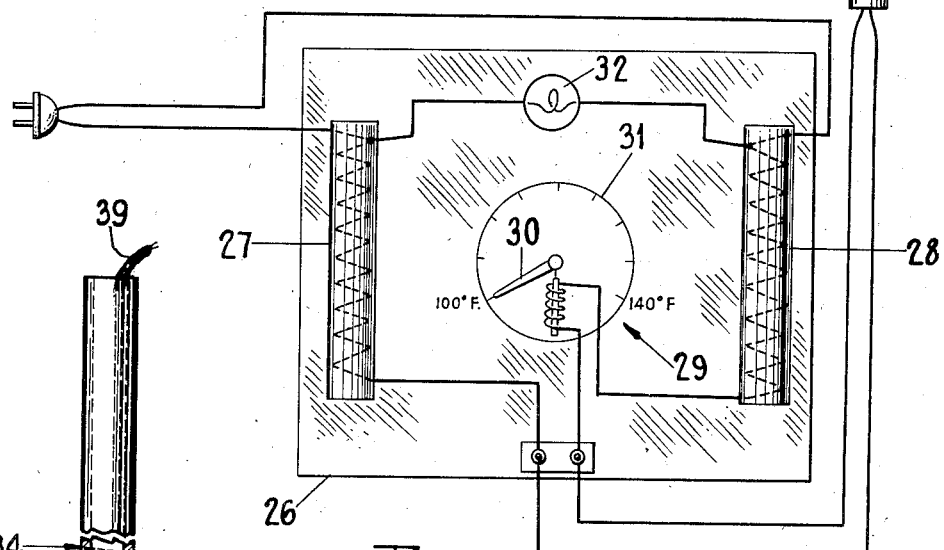
Fig.3
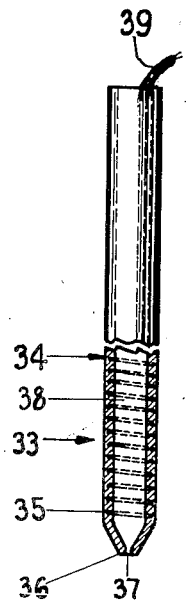
Fig.4
DAVID I. SOLOMON
INVENTOR.
BY Joseph Blacker
ATTORNEY Patented Feb. 2, 1937

2,069,284

UNITED STATES PATENT OFFICE 2,069,284

ELECTROTHERMAL THERAPEUTIC APPARATUS

David I. Solomon, New York, N. Y.

Application February 6, 1935, Serial No. 5,166

4 Claims. (Cl. 128—401)

This invention relates to an electro-thermal therapeutic appliance designed to be inserted into the vagina for treating diseased tissues and for the bactericidal effect in the tissues contiguous to such cavities by means of local applications of heat.

An object of this invention is to provide means externally visible whereby the heat applied internally in the vagina is accurately disclosed on a register which indicates the temperature on the surface of the appliance in the cavity.

Another object of this invention is to provide a therapeutic appliance formed of a pliant tubular material such as rubber, the said appliance having a through central opening so as to be adapted to be contracted transversely before insertion into the vagina and which will regain its normal large size after insertion.

Another object of this invention is to make said appliance oblique to the longitudinal axis at the inserting end so as to adapt it for entering the posterior fornix while permitting the cervix to enter into the central opening of the appliance when used for vaginal purposes.

Another object of this invention is to make said appliance oblique to the longitudinal axis at the outer end which will cause an angular sliding motion when removed from the vagina and lessen the discomfort to the patient.

Another object of this invention is to provide a modified electro-thermal therapeutic appliance adapted for insertion into such openings as the urethra, the esophagus, the stomach, the rectum, etc.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a fragmentary side elevation of an embodiment of the invention designed for treating tissues contiguous to vaginal orifices.

Figure 2 is an end view of the appliance shown in Figure 1.

Figure 3 is a view of a thermal register used in conjunction with the treating appliance.

Figure 4 is a fragmentary view of a modified appliance.

In the illustrated embodiment of the invention shown in Figures 1 and 2, the numeral 10 indicates a therapeutic appliance comprising a tubular member 11, preferably made of pliant material such as rubber and which is a non-conductor of electricity. An electric resistance or heat generating winding 12 is preferably molded in the material all along the length of the member 11 and may extend circumferentially between the inner and outer walls of the member 11. At the end 13 of the member 11 the winding 12 terminates some distance from said end and is entirely concealed in said material. At the opposite end 14, the winding 12 terminates some distance from said end and is entirely concealed in said material but is connected to a lead wire 15. The lead wire 15 is integrally connected with the appliance 10 and terminates in a plug and socket 16.

As shown in Figure 1, the end 13 which is the inserting end when used for vaginal purposes, is formed oblique to the longitudinal axis providing a tapering portion 17, which portion is adapted to enter the posterior fornix 18 of a vagina 22 while permitting the cervix 19 to enter into the central portion 20 of the tubular member 11. The outer end 14 may be formed oblique to the longitudinal axis providing a tapering portion 21 which will cause a sliding motion when removing the appliance 10 from the vagina and lessen the discomfort to the patient. Inasmuch as the perineum 24 has a great tendency to bulge into the vagina and offers a great resistance to any foreign body in the vagina while being removed therefrom, the tapering portion 21 facilitates the movement of such a body over the perineum by approaching same with an angular sliding motion which offers the least resistance. The outer edge of the tapering portion 21 may be curved as indicated by the numeral 23.

As shown in Figure 3, there has been provided a thermal register 25 comprising a panel board 26, having a fixed resistance 27 preferably of about 100 ohms and a resistance 28 preferably of a maximum value of about 100 ohms. A set indicator in the form of a rheostat 29 is mounted on the panel board 26 and has a pointer 30 and a dial 31 indicating degrees of temperature between the extremes of 100° F. and 140° F. A lamp 32 is shown in series in the circuit to indicate whether the circuit is open or closed. When the appliance 10 is under operating conditions in a body cavity, the pointer 30 may be set to any desired temperature graduation on the dial 31 and thus regulate the electric current passing through the resistance winding 12 and control the heat generated in the said winding and transmitted to the tissues around the appliance.

It is to be noted that the appliance 10 has a through opening extending longitudinally from the outer end 14 to the inserting end 13 which permits visibility for diagnosis or treatment.

Figure 4 shows a modified electro-thermal therapeutic appliance 33 comprising a tubular member 34 without angular extensions at the ends such as that shown in Figure 1. The tubular member 34 is made of pliant material such as rubber which is a non-conductor of electricity. An electric resistance winding 35 is preferably molded in the material of the member 34. The inserting end 36 preferably terminates in a narrowed end portion having an opening 37 in alignment with the through opening 38 of the tubular member 34. The appliance 33 is intended for use in such body openings as the urethra, the esophagus, the stomach, the rectum, etc. Because of the transverse pliability of the appliance, it is adapted to readily conform to all the convolutions of the said openings or passages and to return to its original form when removed from such an opening or passage. The appliance being made of rubber which is an electrical non-conductor in which the resistance winding is embedded, is fool-proof in that there is no danger of a short circuit.

A lead wire 39 may extend centrally through the upper portion of the tubular member 34 and form a continuation of the resistance winding 38 in the lower portion. It is to be noted that while the skin of a human body may be injured by a temperature of about 130° F., the tissues lining the hollow viscera of the body can stand such a temperature without any injury. The heated appliances shown in Figures 1 and 4 are intended to be contained entirely within the cavity being treated without heating the skin of the body.

It is to be noted that the resistance windings 12 and 35 are preferably made of wire which permits contraction of the tubular members in a transverse direction before insertion in a cavity and to regain the normal tubular form after insertion. Also that, due to the lateral contractibility, the tubular members will readily yield when encountering any hard or resisting tissue while being inserted or when in a cavity.

I claim:

1. An electro-thermal therapeutic appliance comprising a tubular member made of pliant material and having a through central aperture, electric resistance means disposed intermediate the inner and outer walls of said tubular material, said appliance being oblique to the longitudinal axis of an organ being treated at one end and having connections for an electric circuit at the opposite end, said through aperture permitting visibility therethrough of the organ being treated.

2. An electro-thermal therapeutic appliance comprising a tubular member made of pliant material and having a through central aperture, a circular electric resistance winding disposed circumferentially intermediate the inner and outer walls of said tubular material, said appliance being oblique to the longitudinal axis of an organ being treated at each end and having connections for an electric circuit at one of said ends, said through aperture permitting visibility therethrough of the organ being treated.

3. An electro-thermal appliance comprising a cylindrical member made of electrically non-conductive material and having a through aperture, an electric resistance or heat producing winding molded in said material, said appliance having an angular extension at each end and having connecting means for an electric circuit at one of said ends, said through aperture permitting visibility therethrough of the organ being treated.

4. An electro-thermal therapeutic appliance comprising a tubular member made of pliant and electrically non-conductive material and having a through linearly directed central aperture, electric resistance means disposed intermediate the inner and outer walls of said tubular material, said appliance having connections for an electric circuit at one end, said tubular member and said electrical resistance being designed to permit transverse contraction of said appliance before insertion into an organ being treated and to regain its normal tubular contour after insertion.

DAVID I. SOLOMON.